United States Patent
Godart et al.

(10) Patent No.: US 12,364,183 B2
(45) Date of Patent: Jul. 22, 2025

(54) ASSEMBLY FOR DISPENSING GRANULAR PRODUCTS

(71) Applicant: Ribouleau Monosem, Largeasse (FR)

(72) Inventors: Luc Godart, Toutlemonde (FR); Patrick Beauneveu, Chiche (FR); Bruno Berthonneau, Sauveur (FR)

(73) Assignee: RIBOULEAU MONOSEM, Largeasse (FR)

( * ) Notice: Subject to any disclaimer, the term of this patent is extended or adjusted under 35 U.S.C. 154(b) by 1080 days.

(21) Appl. No.: 17/601,851

(22) PCT Filed: Jun. 11, 2019

(86) PCT No.: PCT/EP2019/065103
§ 371 (c)(1),
(2) Date: Oct. 6, 2021

(87) PCT Pub. No.: WO2020/001964
PCT Pub. Date: Jan. 2, 2020

(65) Prior Publication Data
US 2022/0159902 A1  May 26, 2022

(30) Foreign Application Priority Data
Jun. 27, 2018 (EP) .................................. 18305820

(51) Int. Cl.
*A01C 7/04* (2006.01)
*A01C 7/10* (2006.01)
*A01C 7/20* (2006.01)

(52) U.S. Cl.
CPC .......... *A01C 7/0445* (2023.05); *A01C 7/0443* (2023.05); *A01C 7/046* (2013.01); *A01C 7/102* (2013.01); *A01C 7/20* (2013.01)

(58) Field of Classification Search
CPC ........... A01C 7/046; A01C 7/102; A01C 7/20; A01C 7/044; A01C 7/042; A01C 7/04;
(Continued)

(56) References Cited

U.S. PATENT DOCUMENTS

| 2003/0159631 A1 | 8/2003 | Sauder et al. |
| 2010/0192818 A1 | 8/2010 | Garner et al. |

(Continued)

FOREIGN PATENT DOCUMENTS

| CN | 2237320 Y | 10/1996 |
| CN | 104956815 A | 10/2015 |

(Continued)

OTHER PUBLICATIONS

International Search Report and Written Opinion, re PCT Application No. PCT/EP2019/065103, mailed Jul. 23, 2019, in 3 pages.

*Primary Examiner* — Christopher J. Novosad

(57) ABSTRACT

A distribution assembly for distributing a granular product that are to be distributed on the ground comprises, a mechanism for distributing granular product singly, a mechanism for conveying singled granular product to the ground, and a mechanism for transferring the singled granular product from the mechanism for distributing to the mechanism for conveying. The mechanism for transferring may be synchronized in terms of speed and in terms of position with the mechanism for distributing, and the mechanism for transferring may capture the granular product singly and immobilize it within the mechanism for transferring, so as to keep each granular product spaced a determined and constant distance from one another, in the mechanism for transferring and during the transfer of the granular product to the mechanism for conveying.

13 Claims, 8 Drawing Sheets

(58) Field of Classification Search
CPC .... A01C 7/10; A01C 7/08; A01C 7/00; A01C 7/0445; A01C 7/0443
See application file for complete search history.

(56) References Cited

U.S. PATENT DOCUMENTS

| | | |
|---|---|---|
| 2010/0192819 A1 | 8/2010 | Garner et al. |
| 2014/0230705 A1 | 8/2014 | Radtke et al. |
| 2015/0059630 A1 | 3/2015 | Kinzenbaw et al. |
| 2016/0143213 A1 | 5/2016 | Kowalchuk |
| 2017/0034995 A1 | 2/2017 | Wilhelmi et al. |

FOREIGN PATENT DOCUMENTS

| | | |
|---|---|---|
| CN | 104956815 B | 11/2016 |
| EP | 2213152 A1 | 8/2010 |
| EP | 2213152 B1 | 12/2011 |
| FR | 2414288 A1 | 8/1979 |
| GB | 124890 A | 4/1919 |
| WO | WO 2013/049198 A1 | 4/2013 |
| WO | WO 2015031840 A1 | 3/2015 |
| WO | WO 2018/093568 A2 | 5/2018 |

ASSEMBLY FOR DISPENSING GRANULAR PRODUCTS

SUBJECT OF THE INVENTION

The present invention relates to an assembly for individually distributing a granular product, preferably a seed, to a seeding element and to a seeder comprising such a distribution assembly, and to a method for distributing a granular product.

PRIOR ART

Seeders for distributing granular products, such as plant-protection products, fertilizer or seed, conventionally comprise a chassis, mounted on or drawn by an agricultural vehicle such as a tractor, and seeding elements arranged at regular intervals in order to deposit granular products on the ground.

Among seed-planting seeders are those referred to as "single-seed" or precision seeders because they comprise an assembly for distributing and planting row by row, allowing the seeds to be placed with precision in a furrow. Such a seeder is able to open a furrow of a controlled depth, deposit the seeds therein one by one, spaced apart in the bottom of the furrow, then close the furrow over again to ensure that the entirety of the seeds is in contact with the ground.

The majority of mechanical distribution assemblies use a pneumatic principle, the seeds being loaded, one by one, by suction or vacuum, into pockets arranged in the periphery of one face of a distribution disk, which rotates, the seeds then being released by blowing or by stopping the vacuum.

In the case of vacuum distribution assemblies, the distribution disk is arranged substantially vertically and separates a compartment that acts as seed reservoir from a compartment containing no seeds and subjected to a vacuum. The vacuum applied to one side of the distribution disk allows the seeds from the reservoir to be captured in each of the pockets in the disk, and thus isolated. The singled seeds thus captured, are then unloaded, one by one, by the rotation of the distribution disk, carrying the pockets containing the singled seed toward a region to which no vacuum is applied. The seeds are then released from the distribution disk and drop into the furrow.

The arrangement of the pockets on the distribution disk, particularly the distance separating each of the pockets and the speed at which the disk rotates determine the final distance between each seed in the furrow, this being true irrespective of the speed at which the seeder is working.

In general, the pockets in the distribution disks have a substantially circular shape, and dimensions that are mutually identical within the one same disk, making them capable of accepting seeds of all shapes and sizes. However, this multifunctionality presents a major disadvantage. Specifically, the seeds of a given type, like all granular products incidentally, do not generally all have the same shape, or the same size: as a result, they do not take up the same amount of space in the pockets of the distribution disk, and this introduces a variable separation between the seeds and thus introduces variability into the distances between seeds on the ground.

In certain seeders, the distribution assembly further comprises or collaborates with conveying means that convey the granular products to the ground, and which usually comprise or take the form of a guide chute, that direct the seeds as they fall and prevent them from dropping outside of the furrow.

The channeling role of such a chute is all the more important when the distribution assembly is at a significant height off the ground. This is because the chute generally adopts a profile that allows the seeds to slide, and has a shape that allows them to be given a path which is beneficial to their placement in the furrow. In addition, the shape of the chute allows the height from which the seed is dropped to be used to impart to the seed, as it leaves the chute, a horizontal speed component which is at least equal to the speed of forward travel of the seeder, but in the opposite direction. The magnitude of this speed has a not insignificant effect on the phenomenon whereby seeds roll back in the bottom of the furrow, and therefore on the loss of precision in the placement of the seeds. Because, for a given seeding element, the height of drop is constant, in an assembly relying only on the effects of gravity, the horizontal speed can attain a maximum optimal value and never exceed that value. This gives the seeder an optimum maximum speed above which there will be a loss of precision through that rollback effect.

In addition, the use of a chute is often detrimental to the precision of the placement of the seeds. This is because the repeated impacts of the seeds against the walls of the chute as they fall, and the vibrations caused by the operation of the seeder, or else brought about by the unevenness of the ground, disrupt the depositing of the seeds on the ground, and this causes the distance between the seeds to vary greatly.

Thus, for distribution assemblies comprising both distribution disks and guide chutes, the effect of the offsetting of the seeds at the level of the disk and the rollback phenomenon combine to appreciably increase the loss of precision in the placement of the seeds on the ground and render the spacing between the seeds variable.

The conveying means may also comprise, instead of and in place of a chute, a pair of rotary belts spaced apart, and between which the seeds are received from the distribution disk, and the movement of which carries the seeds to the ground, as described in document US 2016/0143213, or else a brush belt accepting each seed at the ends of the bristles of the brush, as described in documents EP 2213152 and US 2010192819, or else a cleated belt collaborating with an inclined part forming part of the conveying means, as described in documents WO 2013/049198 and US 2014230705.

However, in such distribution assemblies, the precision with which the seeds are deposited on the ground is afforded both by the distribution disk, which sets the rate at which the seeds are supplied, and by the conveying means, the rate of travel of which needs to be harmonized with the speed of travel of the machine in order to avoid any rollback of the seeds as they leave the conveyor. These assemblies therefore exhibit a great deal of variability in the distances between seeds on the ground, because the effect of the separating of the seeds at the level of the distribution disk is amplified by these conveying means.

In addition, these distribution assemblies have the disadvantage of not being suited to granular products of small size, in addition to being susceptible to significant wear because of the fact that the transfer is effected by pinching.

Certain distribution assemblies further comprise means of transfer between the distribution disk and the conveying means conveying the seeds to the ground.

Documents WO 2013/049198 and US 2014230705 also describe the transfer of singled seeds from a vacuum-type distribution disk toward conveying means comprising a cleated belt, through the use of two wheels arranged tangentially and rotating in opposite directions from one another, to collect the seed from the distribution disk and transfer it to the conveying means.

Here again, this type of distribution assembly has the disadvantage of not being very precise in the positioning of the seeds on the ground, because these seeds are caught regardless of their position on the distribution disk and transferred to the conveying means regardless of the position of the cleats. The seeds can therefore become wedged in the casing of the distribution assembly and/or in the casing of the conveying means.

Therefore, and particularly in the case of assemblies for the distribution of singled granular products, and more particularly still in the case of distribution assemblies with distribution disks, there is a growing need for a distribution solution which is sufficiently precise for increasingly high working speeds and allows distribution that is constant bearing in mind the differences in speed between the distribution assembly and the working speed of the seeder.

OBJECTS OF THE INVENTION

The present invention seeks to provide a distribution element for distributing granular products, a seeder comprising such a distribution element, and a distribution method for distributing granular products on the ground, which do not have the disadvantages of the prior art.

The present invention seeks to provide an alternative to the existing solutions of the prior art.

The invention proposes a solution that makes it possible to control the path and journey of the granular product, particularly of a seed, from the product reservoir until such point as it is deposited on the ground, and, in the case of seeds, in the furrow.

The invention proposes a solution that makes it possible to keep the interval separating each granular product, particularly each seed, on the ground more constant.

SUMMARY OF THE INVENTION

The present invention relates to a distribution assembly for distributing granular products on the ground comprising distribution means for distributing the granular products singly, conveying means for conveying the singled granular products to the ground, and transfer means for transferring the singled granular products from the distribution means to the conveying means, the transfer means being synchronized in terms of speed and in terms of position with the distribution means and the transfer means capturing the granular products singly and immobilizing them within the transfer means, so as to keep each granular product spaced a determined and constant distance from one another, in the transfer means and during the transfer of the granular products to the conveying means.

According to particular embodiments of the invention, the distribution assembly according to the invention comprises at least one, or any suitable combination, of the following features:
- the conveying means keep the distance between each singled granular product, which distance has been fixed by the transfer means, constant until they reach the ground,
- the transfer means are synchronized in terms of position with the conveying means,
- the distance between each singled granular product in the transfer means is adjustable,
- the transfer means comprise one or more singling wheels each able to rotate about an axis and comprising pockets able to receive one granular product at a time,
- the singling wheel or wheels comprise walls able to move between a radial position and a circumferential position, about an axis of articulation situated at the periphery of the wheel or wheels and parallel to the axis of the wheel or wheels,
- the singling wheel or wheels comprise fixed radial walls and mobile partitions comprising a proximal end close to their axis of articulation and a distal end, the opposite end to the proximal end, the axis of articulation being parallel to the axis of the singling wheel or wheels and being positioned at the periphery of said singling wheel or wheels, the mobile partitions moving from a position referred to as "closed", in which the distal end is in the continuation of the proximal end of an adjacent pocket, to a position referred to as "open", in which the distal end extends radially toward the axis of rotation of said singling wheel or wheels,
- the mobile partitions move from the "closed" position to the "open" position via the action of a cam working against the force of a spring, and from the "open" position to the "closed" position via the relaxation of the spring,
- the distribution means for distributing the granular product singly comprise one or more distributor disks, able to rotate, and comprising two faces, of which at least a first face comprises, arranged on its periphery, pockets able to receive the granular products singly,
- the conveying means are or comprise a cleated conveyor.

The present invention also relates to a seeding element comprising one or more distribution assemblies for distributing granular products on the ground according to the invention.

The present invention additionally relates to a seeder comprising one or more seeding elements according to the invention.

The present invention also relates to a method for distributing granular products on the ground comprising the steps of picking up granular products singly from the distribution means and depositing them in transfer means in a manner that is synchronized in position and in speed, capturing the granular products singly from the distribution means and immobilizing them within the transfer means, so as to keep each granular product spaced a determined and constant distance away from one another in the transfer means, transferring the singled granular products to conveying means while keeping the distance between the successive singled granular products constant, conveying the successive singled granular products as far as the ground, using conveying means, while keeping the distance between the successive singled granular products constant until they reach the ground.

According to particular embodiments of the invention, the method according to the invention implements one or more distribution assemblies according to the invention, the seeding element according to the invention or the seeder according to the invention.

DETAILED DESCRIPTION OF THE INVENTION

In the remainder of the description and in the claims, the terms "top", "bottom", "above", "below", "upper", "lower", "vertical" and "horizontal" refer to the normal position of the distribution assembly 1 according to the invention and of the elements of which it or they are composed in their normal use and, in particular, refer to its or their position as depicted in FIGS. 1 to 19.

The distribution assembly 1 according to the invention is able to distribute on the ground all kinds of granular products. However, by way of nonlimiting example, such an assembly 1 will be described in respect of the distribution of seed, particularly of seeds 2, on the ground.

Figure 2:
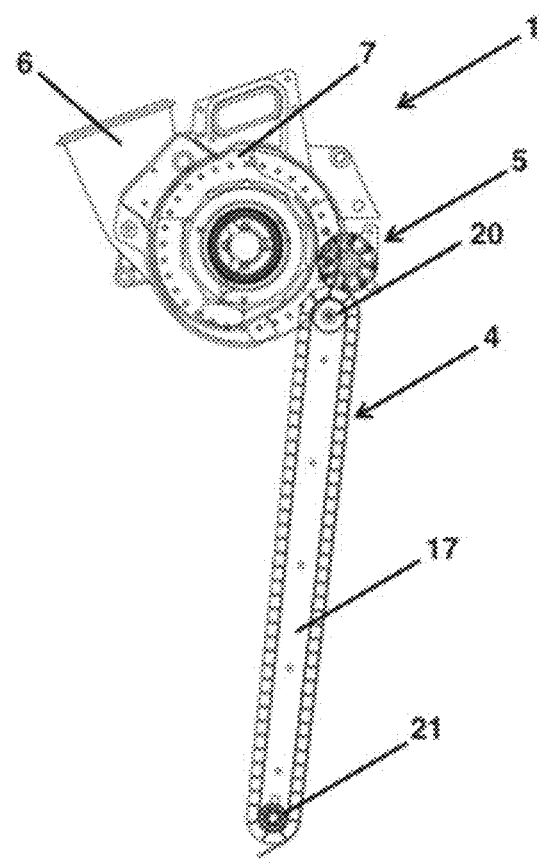
FIG. 2 is a schematic depiction of one particular embodiment of the distribution assembly according to the invention.

The distribution assembly 1 comprises distribution means 3 for distributing singled seeds 2, conveying means 4 for conveying the singled seeds as far as the ground, and transfer means 5 for singly transferring the singled seeds from the distribution means 3 to the conveying means 4 (FIG. 2).

The distribution assembly 1 may further comprise, or collaborate with, storage means for storing the seeds 2, for example comprising a feed reservoir 6, or a feed hopper, filled with seeds 2 when the distribution assembly 1 is in use and/or means for sucking and/or blowing the seeds 2 which collaborate with the distribution means 3 for distributing the singled seeds 2.

Figure 3:
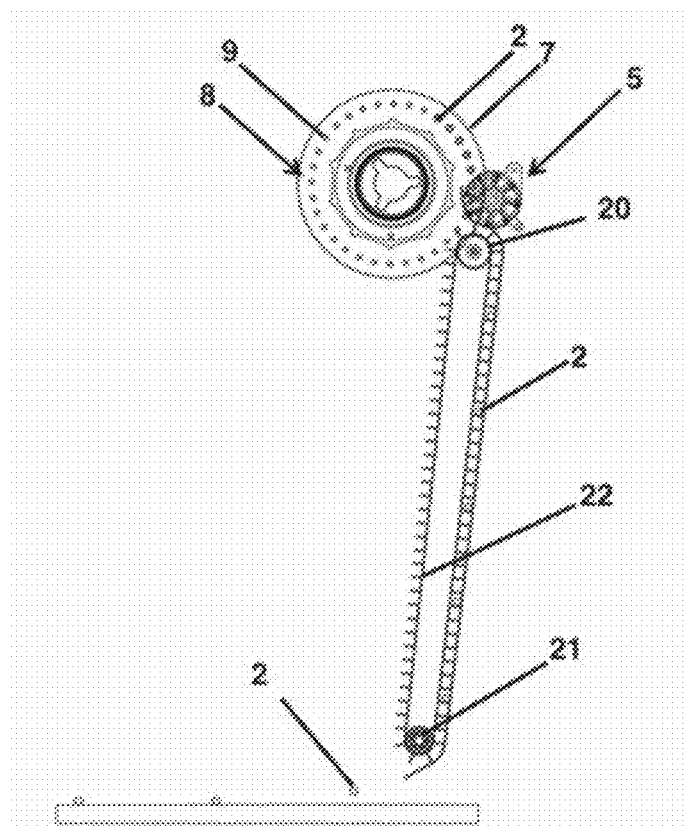
FIG. 3 is a schematic depiction of the transfer of granular products as far as the ground in the distribution assembly according to the invention.
Figure 4:
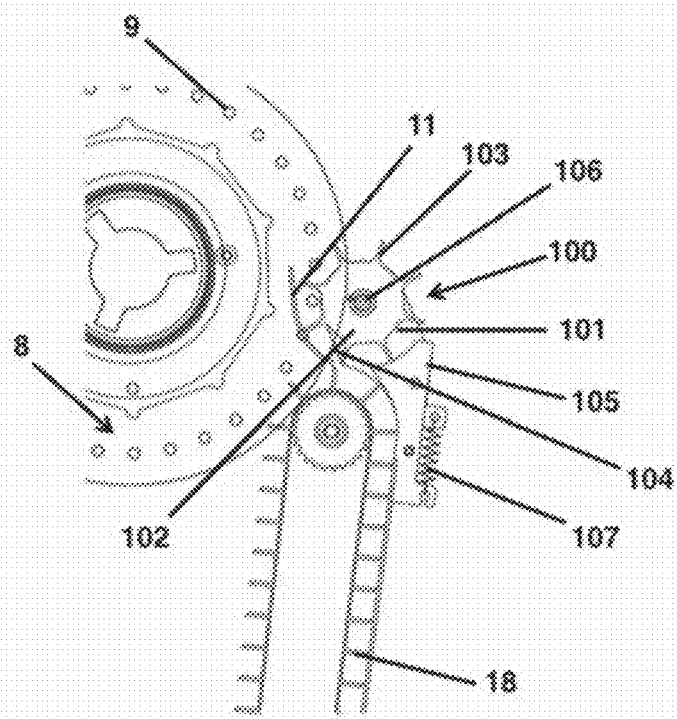
FIG. 4 is a schematic depiction of a first embodiment of the transfer means for transferring the singled granular products between the distribution means and the conveying means for conveying the singled granular products to the ground.
Figure 5:
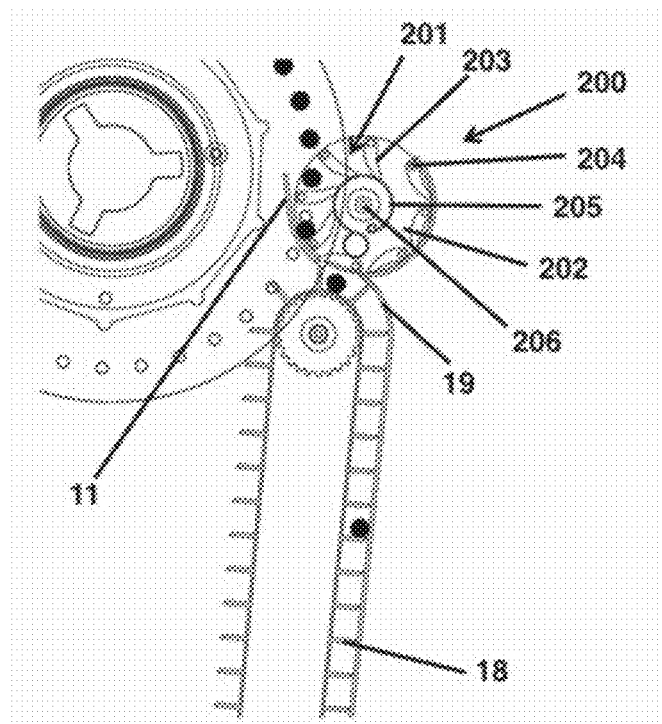
FIG. 5 is a schematic depiction of a second embodiment of the transfer means for transferring the singled granular products between the distribution means and the conveying means for conveying the singled granular products to the ground.
Figure 6:
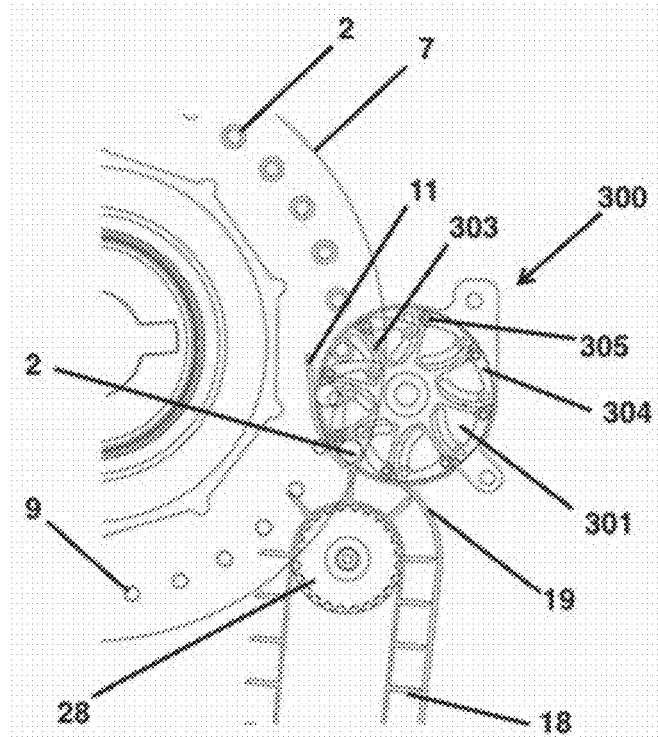
FIG. 6 is a schematic depiction of a third embodiment of the transfer means for transferring the singled granular products between the distribution means and the conveying means for conveying the singled granular products to the ground.

The distribution means 3 for distributing the singled seeds 2 are any means able to pick up seeds 2 singly, which means to say one by one, from a reservoir 6 so that they can be deposited singly on the ground (FIGS. 3 to 5).

As a preference, these distribution means 3 comprise one or more distributor disks 7 for the distribution of seeds 2, the disks preferably being substantially flat, and comprising two faces, of which at least a first face 8 comprises, arranged on its periphery, pockets 9 able to receive one seed 2 at a time.

The pockets 9 may have a substantially circular, ovoid or elliptical section and have dimensions, preferably identical around the entire periphery of the distributor disk 7. The pockets 9 advantageously in their bottom comprise a hole opening onto the second face, so as to allow a vacuum or a pressure to be applied in each pocket 9 using a gas, for example air.

The distributor disk or disks 7 are preferably arranged substantially vertically, adjacent to one or more feed reservoirs 6, the first face 8, comprising the pockets 9, thus being in contact with the seeds 2 arranged in at least one feed reservoir 6. The distribution disk or disks 7, able to rotate by virtue of drive means, capture a seed 2 in each pocket 9, by suction or vacuum created on the second face of the distribution disk 7. The seeds 2 thus singled out into individual form and captured in each pocket 9 are then released, one by one, by stopping the suction or the vacuum, so that they can be taken up by transfer means 5 at the zone at which the suction or the vacuum is stopped, or at a zone situated just before that.

The transfer means 5 for transferring the seeds 2 from the distribution means 3 to the conveying means 4 capture the granular products singly and immobilize them within the transfer means 5 so that each granular product is spaced from one another by a determined distance that remains substantially identical between each granular product, and constant, in the transfer means 5 and while they are being transferred to the conveying means 4. That allows the transfer means 5 to set the distance between each granular product (a distance known as the "spacing") to a determined value which is constant throughout the use of the transfer means 5 and between each successive granular product. These transfer means 5 thus govern the distance on the ground separating each granular product, unlike in the solutions of the prior art in which it is the distribution means, by means of the distance separating each pocket and the rotational speed of the distribution disk, that determine this distance on the ground.

These transfer means offer the advantage of eliminating the separations produced by the picking up and setting down of the seeds 2, into and from the distribution means 3, particularly where these comprise a distribution disk 7, and also the separations introduced by the conventional transfer means for transferring the seeds 2 to the conveying means 4.

Figure 16:
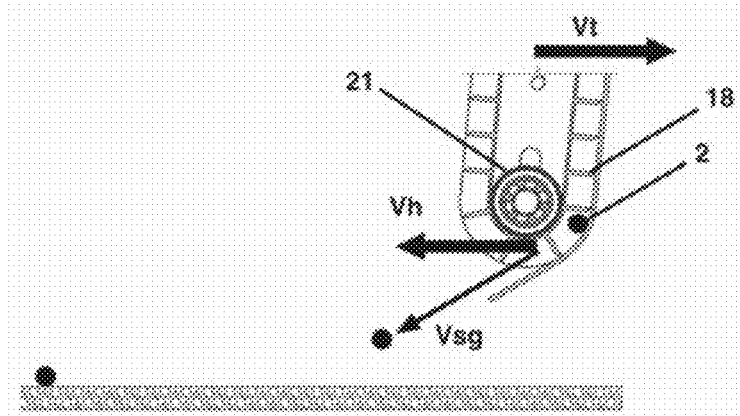
FIG. 16 is a schematic side view of the components of speed to which the granular products are subjected as they exit the conveying means.

As a preference, the transfer means 5 according to the invention are synchronized in terms of speed and in terms of position with the conveying means 4, this offering the advantage of limiting, or eliminating, the separations in distance which are produced by the transfer of the seeds 2 to the conveying means 4. Thus, the final distance on the ground between the seeds 2 is given by the frequency of transfer of the seeds 2 from the transfer means 5 to the conveying means 4. In addition, that means that the relative speed of the seeds 2 with respect to the ground is as low as possible, preferably zero, while at the same time conforming to the distance between seeds (FIG. 16).

As a preference, the distance between each seed 2 in the transfer means 5 is adjustable, and can therefore be regulated, advantageously according to the type of distribution means 3 and according to the distance between the singled seeds 2 in these distribution means 3.

As a preference, the transfer means 5 comprise at least one singling wheel 100, 200, 300, able to rotate, comprising pockets 101, 201, 301 which are able to receive one seed 2 at a time and which are positioned in register with the distribution means 3 (FIGS. 2 to 9).

For example, in a distribution assembly 1 comprising a distribution disk 7, the singling wheel 100, 200, 300 is synchronized in terms of speed and in terms of position with the distribution disk 7 so that each pocket 101, 201, 301 corresponds to and comes into register with a pocket 9 of the distribution disk 7.

As a preference, the singling wheel 100, 200, 300 is positioned against, or in the vicinity of, the face 8 of the distribution disk 7 that comprises the pockets 9, the axis 106, 206, 306 of rotation of the wheel 100, 200, 300 being substantially parallel to that of the distribution disk 7 and the wheel 100, 200, 300 rotating in the opposite direction to the direction of rotation of the distribution disk 7 (FIG. 4).

Figure 7:
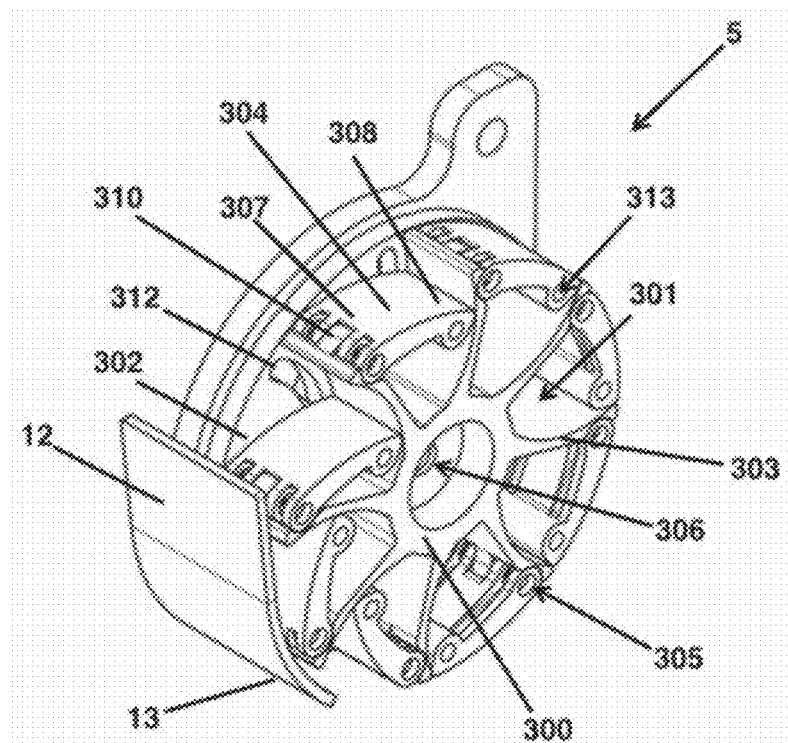
FIG. 7 is a schematic perspective view in detail of the transfer means depicted in FIG. 6.
Figure 8:
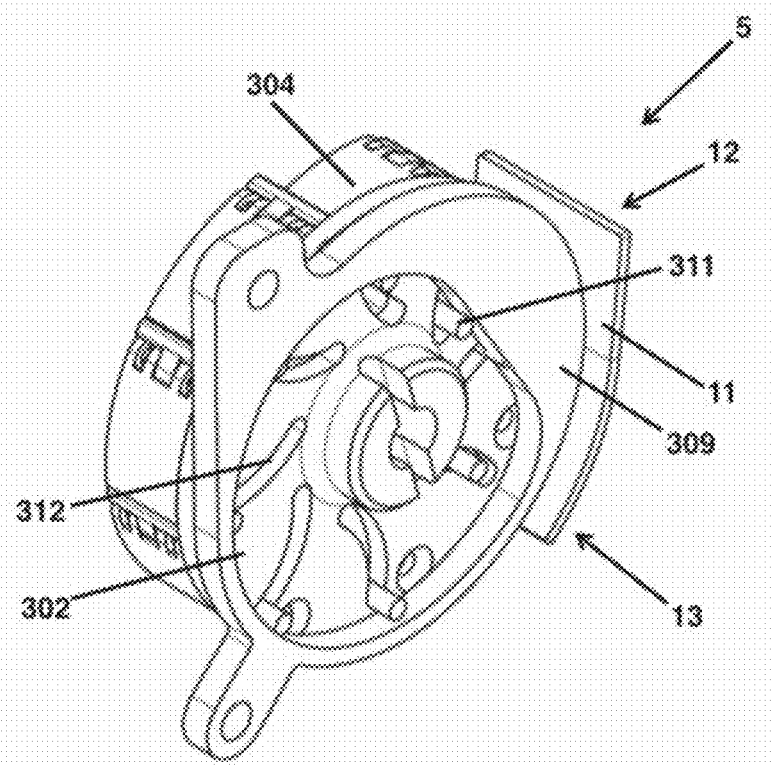
FIG. 8 is a schematic perspective view in detail of the other side of the transfer means depicted in FIG. 7.

As a preference, the pockets 101, 201, 301 of the transfer wheel 100, 200, 300 comprise at least a substantially planar, solid and circular vertical wall 102, 202, 302 and are separated from one another by rigid inelastic partitions 103, 203, 303 extending substantially in the radial direction of the wheel 100, 200, 300, which partitions 103, 203, 303 may be substantially straight (FIG. 4), inclined (FIGS. 6 and 7) or concave (FIG. 8).

The spacing between the seeds 2 is determined by the position of the seeds in the pockets 101, 201, 301 of the singling wheel 100, 200, 300 and particularly by their position on or against the partitions 103, 203, 303 and/or the walls 102, 202, 302.

In the embodiment depicted in FIG. 4, the partition 103 captures the seed 2 from the distribution means 3 and carries it against a first end of a blade 104 of which a second end, opposite to the first, bears against a pushing element 105 equipped with a spring 107. Under the force exerted by the seed 2, the blade 104 forces the pusher 105 to lift by pivoting about an axis which is coaxial with respect to that of the wheel 100, causing tension in the spring 107. The pusher 105 then lowers and drives the seed 2 from the wheel 100 into the conveying means 4 by the relaxing of the spring 107, which is once again compressed by the pusher 105 which has been raised by the pressure exerted by the next seed 2 on the blade 104, and so on.

In the embodiment depicted in FIG. 5, the pockets 201 in the wheel 200 are delimited by walls 203 able to move as the wheel 200 rotates, between a radial position, namely a position in which they extend in the radial direction of the wheel 200, and a circumferential position in which they extend in the circumferential direction of the wheel 200, and vice versa. The walls 203 are each able to move with respect to an axis of articulation 204 situated at the periphery of the wheel 200 and parallel to the axis 206 of the wheel 200, and are set in motion by the action of a spring 205, arranged in the bottom part of the wheel 200. On moving from the radial position, in which the seed 2 is housed in the pocket 201, to the circumferential position, by its own pivoting, the wall 203 introduces the seed 2 into the conveying means 4, the cycle of the spring 205 corresponding to the frequency at which the seeds 2 are transferred.

As a preference, the walls 203 have a profile, namely a longitudinal section, of biconvex, symmetric or asymmetric, or plano-convex shape.

In the embodiment depicted in FIGS. 6 to 9, the wheel 300 comprises pockets 301 delimited by radial walls 303, preferably concave ones, and closed by moving partitions 304, pivoting about an axis of articulation 305 which is parallel to the axis 306 of the singling wheel 300, and which is arranged circumferentially on the vertical wall 302.

The mobile partitions 304 have a proximal end 307, which is close to their axis of articulation 305, and a distal end 308, which is the opposite end to the proximal end 307.

The mobile partitions 304 can move from a position referred to as "closed", in which the mobile partitions 304 extend longitudinally along the periphery of the vertical wall 302 of the wheel 300, the distal ends 308 lying in the continuation of the proximal ends 307 of the pockets 301 that are adjacent, thus closing the pockets 301, to a position referred to as "open", in which the distal end 308 of the mobile partition 304 extends radially toward the axis of rotation 306 of the wheel 300, opening the pockets 301 in their upper part, at the periphery of the wheel 300 (FIG. 7).

The mobile partition 304 of a pocket 301 moves from the closed position to the open position in order to receive in the pocket 301 the singled seed 2 coming from the distribution means 3, for example from the distribution disk 7. In order to do that, the mobile partition 304 angles itself toward the inside of the pocket 301 and therefore toward the axis 306 of the singling wheel 300.

When the mobile partition 304 moves from the open position to the closed position, its distal end 308 rises up toward the periphery of the wheel 300 and acts like a pusher or an ejector to expel the seed 2 from the pocket 301 toward the conveying means 4.

Thus, the spacing between the seeds 2 is dependent on the distance between each seed 2 arranged on the distal end 308 of each mobile partition 304 of each pocket 301 of the singling wheel 300.

The mobile partitions 304 may have any suitable shape. As a preference, they adopt a shape that makes it possible to reconstitute a closed wheel 300 the peripheral surface of which is substantially continuous when the mobile partitions 304 are in the closed position, externally abutting on the periphery of the wheel 300.

As a preference, the mobile partitions 304 may have a profile, namely a longitudinal section, that is substantially linear in order to form a secant with the vertical circular wall 302 or a longitudinal section in the form of an arc of a circle, preferably identical or similar to the arc of circumference of the vertical wall 302, and therefore of the wheel 300, the mobile partitions 304 then being able to have a biconvex symmetrical or asymmetrical or plano-convex profile.

As a preference, each mobile partition 304 is actuated by a cam 309 which causes it to move from the open position, to allow the loading of the seed 2, against the force of a spring 310 which, on relaxing, closes it again and isolates it from the outside.

As a preference, the cam 309 opens the pocket 301 by acting on one end of a pusher 311 passing through an open slot 312 extending in the vertical wall 302 substantially in the radial direction of the wheel 300, the other end of the pusher 311 engaging an opening 313 made in the distal end 308 of the mobile partition 304. The shape of the cam 309 determines the amplitude of the opening of the pocket 301 (FIG. 8).

The movement of the mobile partitions 304 between their open position and their closed position occurs during the rotation of the wheel 300, and of the distribution disk 7 where present.

Whatever the type of wheel 100, 200, 300 considered, and in order to prevent the seed 2 from being ejected from the wheel 100, 200, 300 before it reaches the conveying means 4, it is preferable to provide a retaining guide 11 that keeps the seed 2 captured in each pocket 101, 201, 301 during rotation of the wheel 100, 200, 300, and therefore during its transfer to the conveying means 4, and allowing it to be guided toward the conveying means 4.

The guide 11 is arranged substantially tangentially to the wheel 100, 200, 300 and preferably adopts the shape of an arc of a circle, advantageously compatible with or identical to the arc of the circumference of the vertical wall 102, 202, 302, and therefore of the wheel 100, 200, 300. The guide 11 comprises an upper end 12 at which the pockets 101, 201, 301 receive the singled seed 2, and a lower end 13 which constitutes the point at which the singled seed 2 is ejected toward the conveying means 4. As the seed 2 arrives at this lower end 13, it is urged in three directions, a radial component with respect to the singling wheel 100, 200, 300, produced by the pressure of the walls 103, 203, 304 and of the mobile partition 304 on the seed 2, a reaction produced by the guide 11, which also imparts friction to the seed 2, and a tangential component given by the rotation of the singling wheel 100, 200, 300.

As a preference, and whatever the transfer and spacing means 5, the latter comprise or collaborate with means for keeping the seeds 2 singled as they are being received from the distribution means 3. By allowing any double seeds 2 to be pushed aside or allowing seeds 2 that have shifted relative to the pockets 9 of the distribution disk 7 to be repositioned, these means offer the advantage of preventing several seeds 2 from becoming jammed or wedged at the entry to the transfer and spacing means 5.

Figure 9:
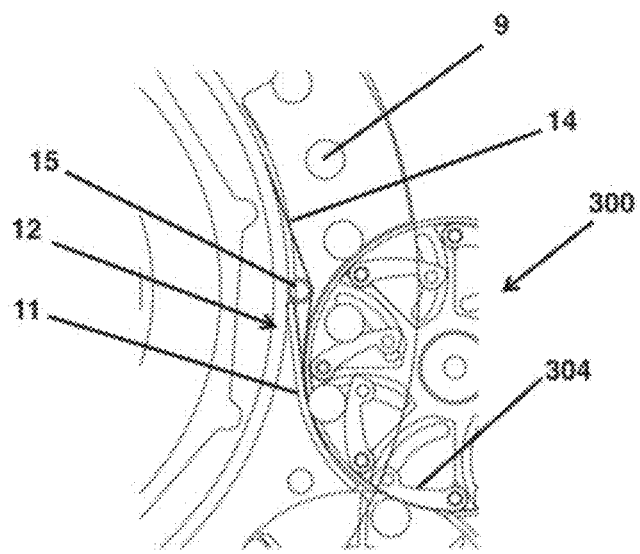
FIG. 9 is a schematic side view of means for keeping the granular products in singled form while they are being received from the distribution means.

As a preference, as depicted in FIG. 9 as in the case of a wheel 300 comprising mobile partitions 304, the means for keeping the seeds 2 singled are, or comprise, a flexible membrane 14 which is positioned substantially tangentially to the wheel 300. As a preference, this membrane 14 is kept in position by an absorber element 15 that absorbs the deformations of the flexible membrane 14, thus acting like a spring and keeping the membrane 14 in position and in shape. As a preference, the absorber element 15 is positioned at the edge of the upper end 12 of the guide 11.

As a preference, the singling wheel 100, 200, 300 is synchronized in terms of position, but also in terms of speed, with the conveying means 4 so that the point at which the seed 2 is ejected from the wheel 100, 200, 300 corresponds to the point at which the seed 2 is loaded into the conveying means 4, thereby allowing correct transfer of the seeds 2 to the conveying means 4. Rapid and precise unloading makes it possible to guarantee correct placement of the seeds 2 in the furrow.

The rotational speed of the wheel 100, 200, 300 is all the greater when its number of pockets 101, 201, 301 is less than the number of pockets 9 in the distribution disk 7 and than the distance between seeds 2 that is desired for sowing. However, it also varies according to the parameters of the distribution assembly 1, of the sowing and of the working speed, and confers upon the seed 2 exiting the conveying means 4 a variable and relatively high tangential speed (FIG. 16). The conveying means 4 preferably operate at a speed greater than or equal to the working speed of the seeder element 16.

For example, for sowing maize that has a distance of 14 cm between seeds on the ground, using a distribution disk 7 having 32 pockets and a singling wheel 100, 200, 300 with eight pockets 101, 201, 301, the speed of the wheel 100, 200, 300 will be approximately 120 revolutions per minute for a speed of forward travel of the distribution assembly 1 of 8 km/h.

As a preference, the speed and the synchronization of the speeds of the singling wheel 100, 200, 300 and of the various means, can be modified so as to maintain the spacing distance, and this offers the advantage that it is possible to achieve a distribution assembly 1 that can be adapted to the desired distances between seeds or to a change in seed 2 population.

The conveying means 4 are any means able to accompany singled seeds 2 as far as the ground, while at the same time making it possible to conform to a determined distance between each seed 2, and which preferably give the seeds 2 a horizontal speed that does not induce any rollback phenomenon, a speed harmonized with, namely equal to or greater than, the speed of the seeding element 16 bearing the distribution assembly 1 according to the invention.

As a preference, these conveying means 4 comprise a cleated conveyor 17 in which some or all of the cleats 18 receive a seed 2, so that the seeds 2 are separated by a distance that corresponds to the spacing distance determined by the transfer means 5.

As a preference, the cleated conveyor 17 comprises at least one wall 19 of which an upper end is positioned tangentially to, and in the vicinity of, the transfer means 5. The wall 19 extends from the transfer means 5 as far as the vicinity of the ground.

As a preference, this wall 19 forms part of a housing which can adopt any appropriate shape and size. The housing comprises an upper first opening, arranged near the transfer and spacing means 5 and a second opening arranged near the ground or the bottom of the furrow and allowing each seed to be deposited there.

Figure 10:
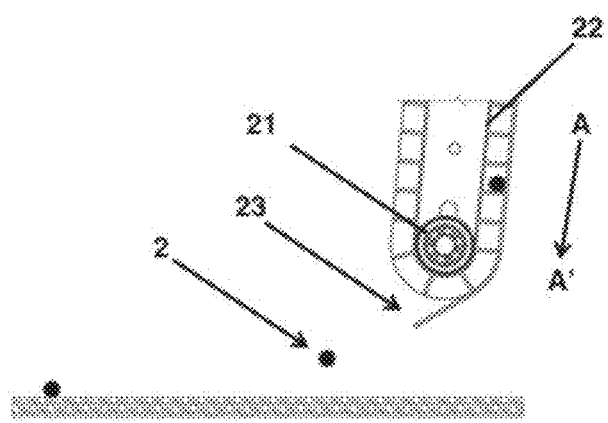
FIG. 10 is a schematic side view of the lower end of a first embodiment of the conveying means for conveying the singled granular products to the ground.

As a preference, the cleated conveyor 17 comprises at least one pair of pulleys 20, 21 supporting a mobile belt 22 and conveying the seeds 2 from the top of the cleated conveyor 17 downward, in the direction A-A', as depicted in FIG. 10. One of the pulleys 20, 21 may be driven, and is therefore coupled to drive means, while the other may be an idling pulley.

As a preference, the upper pulley 20 has a diameter that is greater than that of the lower pulley 21.

In the embodiment in which the transfer means comprise a singling wheel 100, 200, 300, the belt 22 comprising the cleats 17, and therefore the pulley 20, 21 which is the driven pulley rotates in the opposite direction to the direction of rotation of the singling wheel 100, 200, 300.

Figure 1:
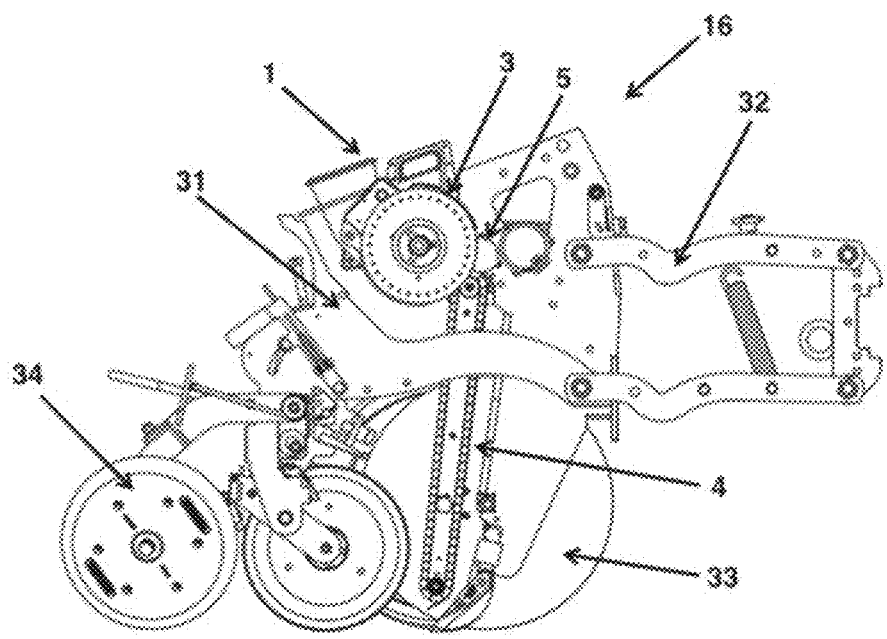
FIG. 1 is a schematic side view of a seeding element comprising a distribution assembly according to the invention.

As a preference, as depicted in FIGS. 1 to 3, the cleated conveyor 17 has a substantially longitudinal shape. It is arranged vertically or obliquely, between the transfer and spacing means 5 and the ground or the bottom of the furrow.

In the embodiment in which the cleated conveyor 17 comprises a housing, the first opening is situated in the upper part of the housing, preferably at its top, while the second opening is situated at its lower end. The upper pulley 20 is arranged in the upper part of the housing, near the upper opening of the housing, and the lower pulley 21 is arranged near the lower opening of the housing.

The belt 22 comprises at least a first face, possibly toothed, in contact with the drive wheel pulleys 20, 21, possibly also toothed, and a second face, the opposite face to the first, and comprising the cleats 18 projecting from this face, that forms a series of spaces to accommodate the seeds 2 which are delimited, at the top and at the bottom, by consecutive cleats 18 and, on one side, by that face of the belt 22 from which the cleats 18 extend and, on the other side, by the wall 19, except in the region of junction with the transfer and spacing means 5 where the wall 19 must not prevent the seed 2 from entering a space.

In the embodiments comprising a singling wheel 200, 300 respectively comprising a mobile wall 203 or a mobile partition 304, the singling wheel 200, 300 is arranged tangentially to the cleated conveyor 17, particularly to the first opening arranged at the top of the housing of the cleated conveyor 17, and the space that has received the seed 2 that is to be conveyed to the ground is closed by the mobile wall 203 or the mobile partition 304 that has pushed the seed 2 into that space. Thus, at the top of the cleated conveyor 17, the seed 2 cannot escape from the conveyor 17.

In the lower part of the conveyor 17, at the level of the second opening in the housing, the space conveying the seed 2 finds itself open again, thus allowing the seed to be released to the ground (FIGS. 10 to 16).

As a preference, the conveying means 4 further comprise guide means 23 guiding the exiting of the seeds 2. As a preference, a guide or an inclined ramp arranged at the level of the second opening of the housing of the cleated conveyor.

With the distribution element 1 moving relative to the ground at a given speed referred to as the working speed (Vt), the belt 22 of the conveyor 17 is driven at a speed such that the horizontal component (Vh) of the exit speed of the seed 2 (Vsg) is equal to, preferably greater than, the working speed, this making it possible to reduce, or even to eliminate, the phenomenon whereby the seed 2 rolls back on the ground (FIG. 16).

Figure 11:
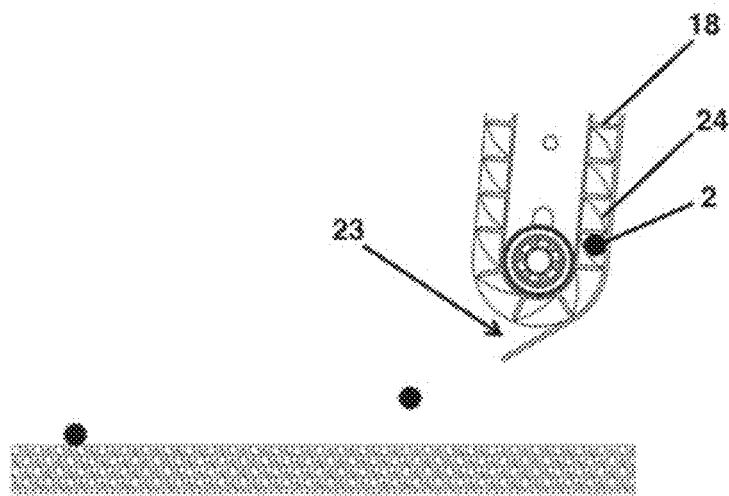
FIG. 11 is a schematic side view of the lower end of a second embodiment of the conveying means for conveying the singled granular products to the ground.
Figure 12:
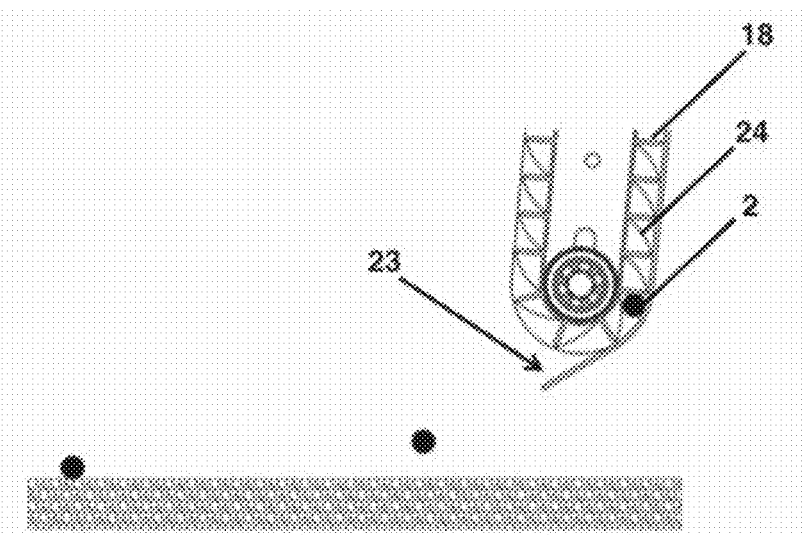
FIG. 12 is another schematic side view of the lower end of the embodiment according to FIG. 11.

In one possible embodiment of the conveying means 4, a wall 24 connects the base of one cleat 18 to the top of the next cleat 18 below (FIGS. 11 and 12). As a preference, this wall 24 is flexible and deformable, and has a length greater than the distance between the two consecutive cleats 18, giving it a concave shape.

That allows the wall 24 to apply light pressure pushing the seed 2 toward the wall 19 and pushing it back upward to bring it into contact with the upper cleat 18, in order to hold it firmly, and therefore stabilize it, in the space in which it is located. In addition, that allows the belt 22 to wrap around the lower pulley 21 without the wall 22 becoming tensioned and causing the cleats 26 to which it is connected to deform or warp.

Thus, according to the concavity and the flexibility or deformability properties of the wall 22, it is possible to adapt to various shapes and sizes of seed 2. In addition, that makes it possible to modify the size of the spaces in the cleated conveyor 17 without adversely affecting the exit speeds of the seed 2.

Figure 13:
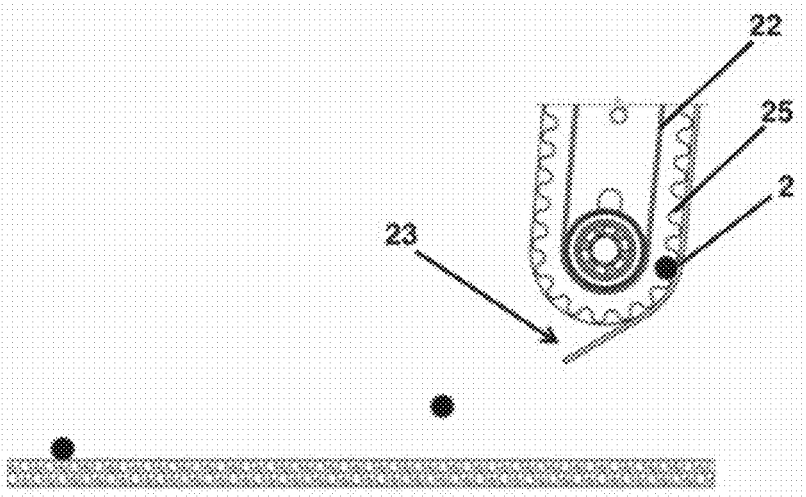
FIG. 13 is a schematic side view of the lower end of a third embodiment of the conveying means for conveying the singled granular products to the ground.
Figure 14:
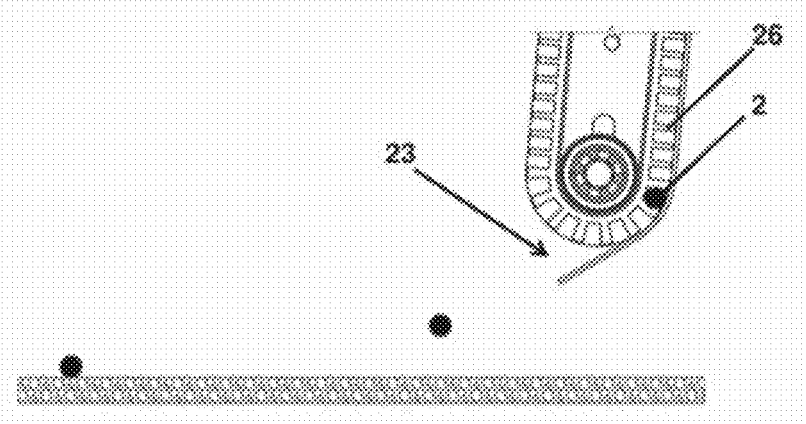
FIG. 14 is a schematic side view of the lower end of a fourth embodiment of the conveying means for conveying the singled granular products to the ground.
Figure 15:
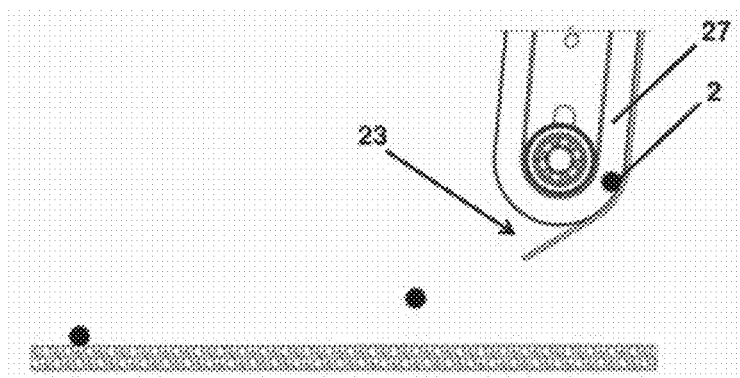
FIG. 15 is a schematic side view of the lower end of a fifth embodiment of the conveying means for conveying the singled granular products to the ground.

In one possible embodiment of the conveying means 4, the belt 22 comprises notched teeth 25 on its second face, forming a toothed belt 22 (FIG. 13). As a preference, these notched teeth 25 have a shape and size that are compatible with those of the seeds 2. Advantageously, the notched teeth 25 are rounded and make it possible to stabilize the seeds against the wall 19.

In one possible embodiment of the conveying means 4, the belt 22 comprises bristles 26 extending as a projection from its second face to form a discontinuous brush, the distance between two consecutive bristles or series of bristles forming the spaces in which the seeds 2 are received, and being chosen so that the seed 2 fits snugly (FIG. 12) therein. That offers the advantage of better stabilizing the seed 2 in the conveying means 4. In addition that makes it possible to refine the way in which the seeds 2 are picked up by adapting the length, flexibility and density of installation of the bristles 26 in order to form regions of greater or lesser stiffness or depth, zones that favor or do not favor the picking up of the seeds 2 in the conveying means 4. This embodiment encourages division of the partitioning and affords a conveying solution that is less, if at all, susceptible to the problems of synchronization in terms of position with the transfer means 5.

In one possible embodiment of the conveying means 4, the belt 22 comprises, or is, a continuous brush 27 comprising bristles extending from, projecting out from, the second face of the belt 22, the density and length of the bristles constituting the brush preferably remaining constant along the length of the belt 22. That offers the advantage of improving the stability of the seed 2 in the conveying means 4 and of being less, if at all, susceptible to the problems of synchronization in terms of position with the transfer means 5.

Figure 17:
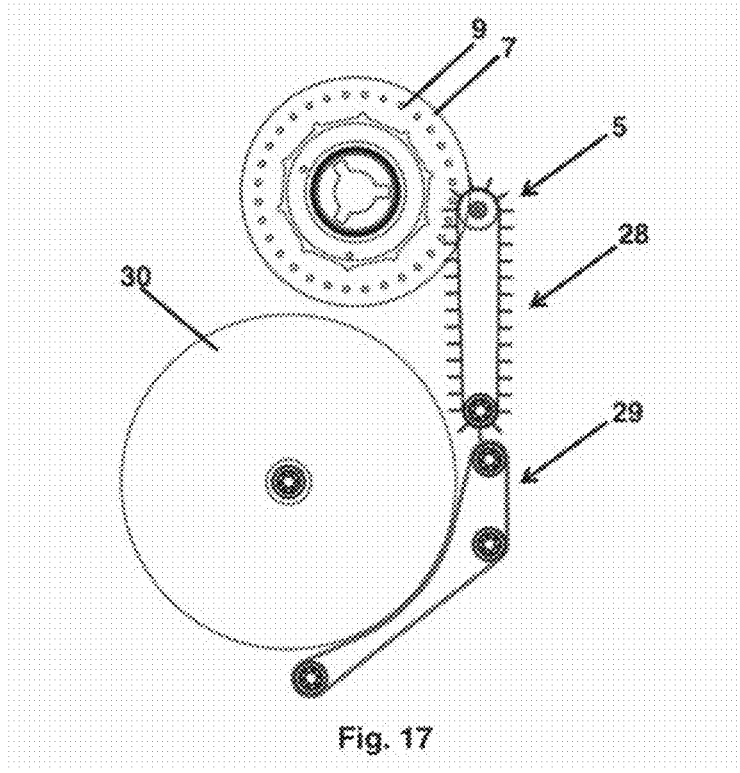
FIG. 17 is a schematic side view of another embodiment of the distribution assembly according to the invention.

In one possible embodiment of the distribution assembly 1, the transfer and spacing means 5 adopt the form and reproduce the function of the conveying means 4 as described hereinabove, which means are synchronized in terms of position and in terms of speed with respect to the distribution means 3, for example the distribution disk 7. As a preference, this is a cleated conveyor 28, of which the cleats form spaces receiving the seeds 2 singly from the pockets 9 of the distribution disk 7. This cleated conveyor 28 is arranged substantially vertically and an upper part tangentially with respect to the distribution disk 7. It is set in motion by at least two pulleys, of which at least one is driven, to convey seeds from the bottom up. On reaching the bottom of the cleated conveyor 28, each seed 2 is then accelerated and directed substantially obliquely or horizontally with respect to the ground so that their horizontal speed is equivalent to or greater than the speed of travel of the seeding element 16 comprising such a distribution assembly 1. As a preference, this change in direction and this acceleration are obtained by a belt conveyor 29 comprising a plane or toothed belt, and an acceleration wheel 30 in contact with a portion of the belt so as to pinch each seed 2 against the belt (FIG. 17).

Figure 18:
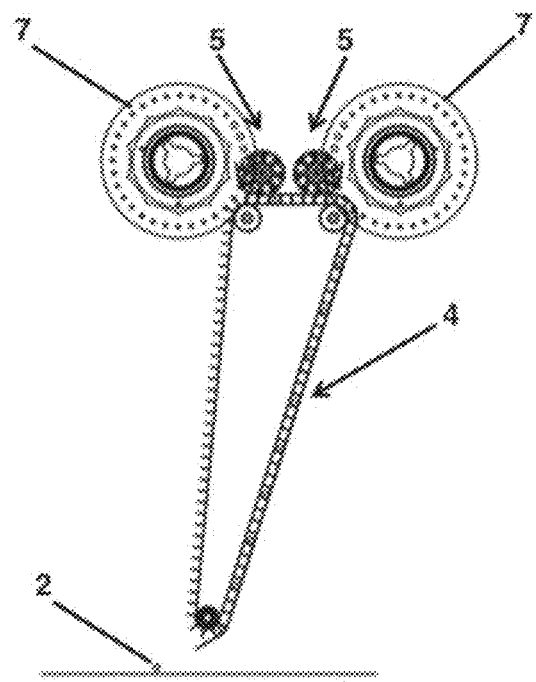
FIG. 18 is a schematic side view of another embodiment of the distribution assembly according to the invention.
Figure 19:
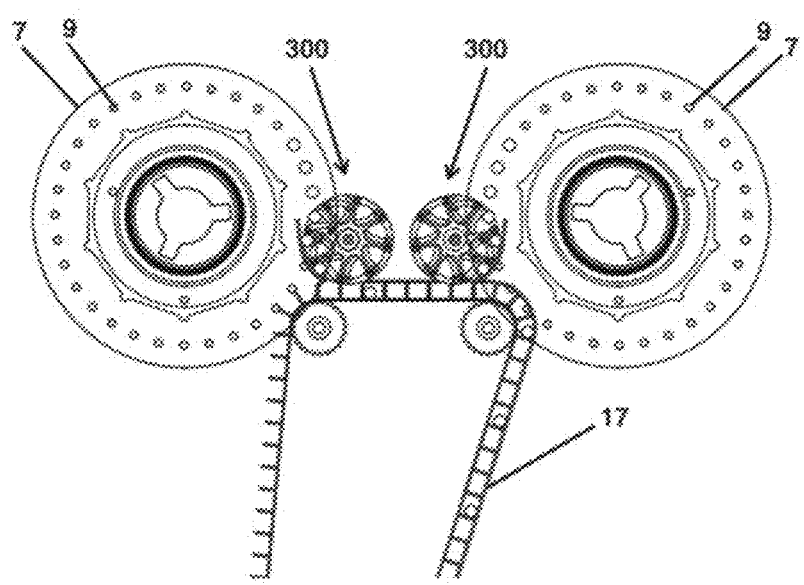
FIG. 19 is a schematic detailed view of the embodiment depicted in FIG. 18.

As a preference, the distribution assembly 1 may comprise a plurality of distribution means 3, advantageously two distributor disks 7, arranged vertically facing one another and rotating in opposite directions, each collaborating with transfer and spacing means 5, advantageously each collaborating with a singling wheel 100, 200, 300 or a cleated conveyor 28, and sharing the same conveying means 4, advantageously with the same cleated conveyor 17 (FIGS. 18, 19).

The seeding element 16 according to the invention comprises one or more distribution assemblies 1 according to the invention.

As a preference, the seeding element 16 comprises a chassis 31 bearing one or several distribution assemblies 1 according to the invention and means 32 of attachment to a seeder, possibly also one or several feed reservoirs supplying seeds 2 and/or means 33 of opening one or more furrows in the ground, means 34 for closing the furrow or furrows once the seeds 2 have been deposited.

The seeder according to the invention comprises one or several seeding elements 16.

The seeding elements 16 of the one same seeder, employing the transfer and spacing means 5 according to the invention, may be synchronized with one another. That offers the advantage that the seeds 2 of one row can be positioned precisely with respect to the next row, thus allowing a precise arrangement of the seeds 2 or allowing them to be aligned perpendicular to the direction of sowing, making it possible to identify the locations of each of the seeds 2, which locations are obtained from the spacing and synchronization information, thus allowing the production of a map of the sowing performed.

The distribution method according to the invention for distributing a granular product as far as the ground comprises the step of picking up a singled granular product using distribution means 3, depositing it into transfer means 5, in a way that is synchronized in terms of speed and in terms of position, and spacing, namely fixing the distance between, the successive singled granular products using the transfer means 5, during the transfer of the singled granular products to the conveying means 4, then conveying the successive singled granular products as far as the ground using the conveying means 4, all while keeping said distance between said successive singled granular products constant until they reach the ground.

As a preference, the transfer of the singled granular products to conveying means 4 is performed by capturing the granular products singly, keeping them captured, then introducing them singly into the conveying means.

The method according to the invention is preferably implemented by the distribution assembly 1 and/or the seeding element 24 and/or the seeder according to the invention.

The invention claimed is:

1. A distribution assembly for distributing a granular product that are to be distributed on the ground comprising:
    a mechanism for distributing said granular product singly,
    a mechanism for conveying said singled granular product to the ground, and
    a mechanism for transferring said singled granular product from the mechanism for distributing to the mechanism for conveying,
    wherein said mechanism for transferring is synchronized in terms of speed and in terms of position with said mechanism for distributing, and
    wherein said mechanism for transferring captures said granular product singly and immobilize it within said mechanism for transferring, so as to keep each granular product spaced a determined and constant distance from one another, in said mechanism for transferring and during the transfer of said granular product to the mechanism for conveying.

2. The distribution assembly of claim 1, wherein said mechanism for conveying is configured to maintain the distance between each singled granular product constant until they reach the ground, wherein the distance is determined by the mechanism for transferring.

3. The distribution assembly of claim 1, wherein the mechanism for transferring is synchronized in terms of position with the mechanism for conveying.

4. The distribution assembly of claim 1, wherein the distance between each singled granular product in the mechanism for transferring is adjustable.

5. The distribution assembly of claim 1, wherein the mechanism for transferring comprises one or more singling wheels each configured to rotate about an axis and comprising pockets configured to receive one granular product at a time.

6. The distribution assembly of claim 5, wherein the one or more singling wheels comprises walls able to move between a radial position and a circumferential position, about an axis of articulation situated at the periphery of said one or more singling wheels and parallel to the axis of said one or more singling wheels.

7. The distribution assembly of claim 5, wherein the one or more singling wheels comprise fixed radial walls and mobile partitions comprising a proximal end adjacent their axis of articulation and a distal end, the opposite end to said proximal end, said axis of articulation being parallel to the axis of said singling wheel or wheels and positioned at the periphery of said one or more singling wheels, said mobile partitions moving from a closed position, in which said distal end is in the continuation of the proximal end of an adjacent pocket, to an open position, in which the distal end extends radially toward said axis of rotation of said one or more singling wheels.

8. The distribution assembly of claim 7, wherein the mobile partitions move from the closed position to the open position via the action of a cam working against the force of a spring, and from the open position to the closed position via the relaxation of said spring.

9. The distribution assembly of claim 1, wherein the mechanism for distributing for distributing the granular products singly comprises one or more distributor disks, able to rotate, and comprising two faces, of which at least a first face comprises, arranged on its periphery, pockets able to receive said granular product singly.

10. The distribution assembly of claim 1, wherein the mechanism for conveying comprises a cleated conveyor.

11. A seeding element comprising one or more distribution assemblies as claimed in claim 1 for distributing granular products on the ground.

12. A seeder comprising one or more seeding elements as claimed in claim 11.

13. A method for distributing granular products on the ground comprising:
    picking up granular products singly from a mechanism for distributing and depositing them in a mechanism for transferring in a manner that is synchronized in position and in speed,
    capturing the granular products singly from said mechanism for distributing and immobilizing them within the mechanism for transferring, so as to keep each granular product spaced a determined and constant distance away from one another in said mechanism for transferring,
    transferring said singled granular products to mechanism for conveying while keeping said distance between the successive singled granular products constant,
    conveying the successive singled granular products as far as the ground, using mechanism for conveying, while keeping said distance between said successive singled granular products constant until they reach the ground.

* * * * *